(12) United States Patent
Shih

(10) Patent No.: US 6,870,332 B1
(45) Date of Patent: Mar. 22, 2005

(54) MULTI-FUNCTIONAL MOTOR CONTROL DEVICE

(76) Inventor: Te Fu Shih, 2F, No. 108, section 1, Hsin-Tai 5 Rd., Hsi-Chih City, Taipei Hsien (TW)

( * ) Notice: Subject to any disclaimer, the term of this patent is extended or adjusted under 35 U.S.C. 154(b) by 0 days.

(21) Appl. No.: 10/756,334

(22) Filed: Jan. 14, 2004

(51) Int. Cl.[7] ................................................ H02P 1/18
(52) U.S. Cl. ...................... 318/254; 318/439; 318/560; 318/800; 318/812; 361/20; 361/23
(58) Field of Search .............................. 318/245, 254, 318/439, 560–569, 700, 771, 800–818; 361/20–32

(56) References Cited

U.S. PATENT DOCUMENTS

| | | | | |
|---|---|---|---|---|
| 4,710,692 A | * | 12/1987 | Libert et al. ................. | 318/729 |
| 4,761,563 A | * | 8/1988 | Ross et al. ..................... | 307/87 |
| 4,796,142 A | * | 1/1989 | Libert .......................... | 361/23 |
| 4,833,628 A | * | 5/1989 | Curran, Jr. .................. | 318/800 |
| 4,876,468 A | * | 10/1989 | Libert ......................... | 327/438 |
| 4,912,390 A | * | 3/1990 | Curran et al. ................ | 318/812 |
| 5,528,444 A | * | 6/1996 | Cooke et al. ................. | 361/20 |
| 5,528,445 A | * | 6/1996 | Cooke et al. ................. | 361/20 |
| 6,683,439 B2 | * | 1/2004 | Takano et al. ............... | 320/132 |
| 6,812,668 B2 | * | 11/2004 | Akiyama ..................... | 318/610 |
| 2001/0028230 A1 | * | 10/2001 | Gotou et al. ................. | 318/254 |

* cited by examiner

Primary Examiner—Paul Ip

(57) ABSTRACT

A multi-functional motor control device is disclosed. A control circuit set are connected between three input currents of different phases and a motor. The control circuit set includes a main control circuit for controlling phase sequences, a control CUP control circuit, a display control circuit, a function key control circuit, a current detection circuit, a silicon control trigger circuit, an input voltage detection circuit. By above components, the phase difference of voltage of power source and feedback current can be determined so as to know the message of a load to control the output of a silicon controlled SCR circuit and thus to control the power saving of the variation of load. Moreover, the message of power voltage can provide the protection of over voltage and low voltage. The detection of current provides the protection of over current or unbalance of currents of different phases and being lack of phase.

1 Claim, 8 Drawing Sheets

MULTI-FUNCTIONAL MOTOR CONTROL DEVICE

FIELD OF THE INVENTION

The present invention relates to power control devices, and particular to a multi-functional motor control device which has functions of full voltage or smooth start, power saving constant speed operation and full voltage or smooth stop; stopping operation in over current or over voltage, full voltage output in low voltage under in non-power saving mode; stopping operation of the motor under the state of losing phase in power or motor as the motor is in operation and provides the protection of over voltage and low voltage and the protection of over current or unbalance of currents of different phases and lack of phase.

BACKGROUND OF THE INVENTION

In the prior art, the ways for controlling the power saving of the operation of a motor includes by using capacitors, voltage reduction, and power control.

The way of using capacitor is to add capacitors before a motor for reducing virtual power and reduce current so as to save power consumption in wires. However, this way has the following disadvantages that the real power does not reduce and the power reduction in wires is farther smaller than the total power consumed by the whole circuit. This way is mainly used to high voltage or low load condition. However, this way cannot achieve the object of easy adjustment so as to harm the motor. An important feature of an AC motor is that the power consumption in a low load is smaller than the power consumption. The lower the load, the larger the power consumed. Thus a part of power can be saved. Using a silicon controlled semiconductor to control the power supply of a motor can reduce the power waste. This idea is firstly disclosed by Nola, 1977 in NASA, U.S. However, this can not resolve the current complicated motor operation conditions and power supply networks. Moreover, there are demands for the functions of full voltage or smooth start, power saving constant speed operation and full voltage or smooth stop; stopping operation in over current or over voltage, full voltage output in low voltage under in non-power saving mode; stopping operation of the motor under the state of losing phase in power or motor as the motor is in operation, but the prior art can not achieve all above mentioned functions.

SUMMARY OF THE INVENTION

Accordingly, the primary object of the present invention is to provide a multi-functional motor control device, wherein a control circuit set are connected between three input currents of different phases and a motor. The control circuit set includes a main control circuit for controlling phase sequences, a control CUP control circuit, a display control circuit, a function key control circuit, a current detection circuit, a silicon control trigger circuit, an input voltage detection circuit. By above components, the phase difference of voltage of power source and feedback current can be determined so as to know the message of a load to control the output of a silicon controlled SCR circuit and thus to control the power saving of the variation of load. Moreover, the message of power voltage can provide the protection of over voltage and low voltage. The detection of current provides the protection of over current or unbalance of currents of different phases and being lack of phase.

Another object of the present invention is to provide a multi-functional motor control device which provides the functions of full voltage or smooth start, power saving constant speed operation and full voltage or smooth stop; stopping operation in over current or over voltage, full voltage output in low voltage under in non-power saving mode; stopping operation of the motor under the state of losing phase in power or motor as the motor is in operation.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
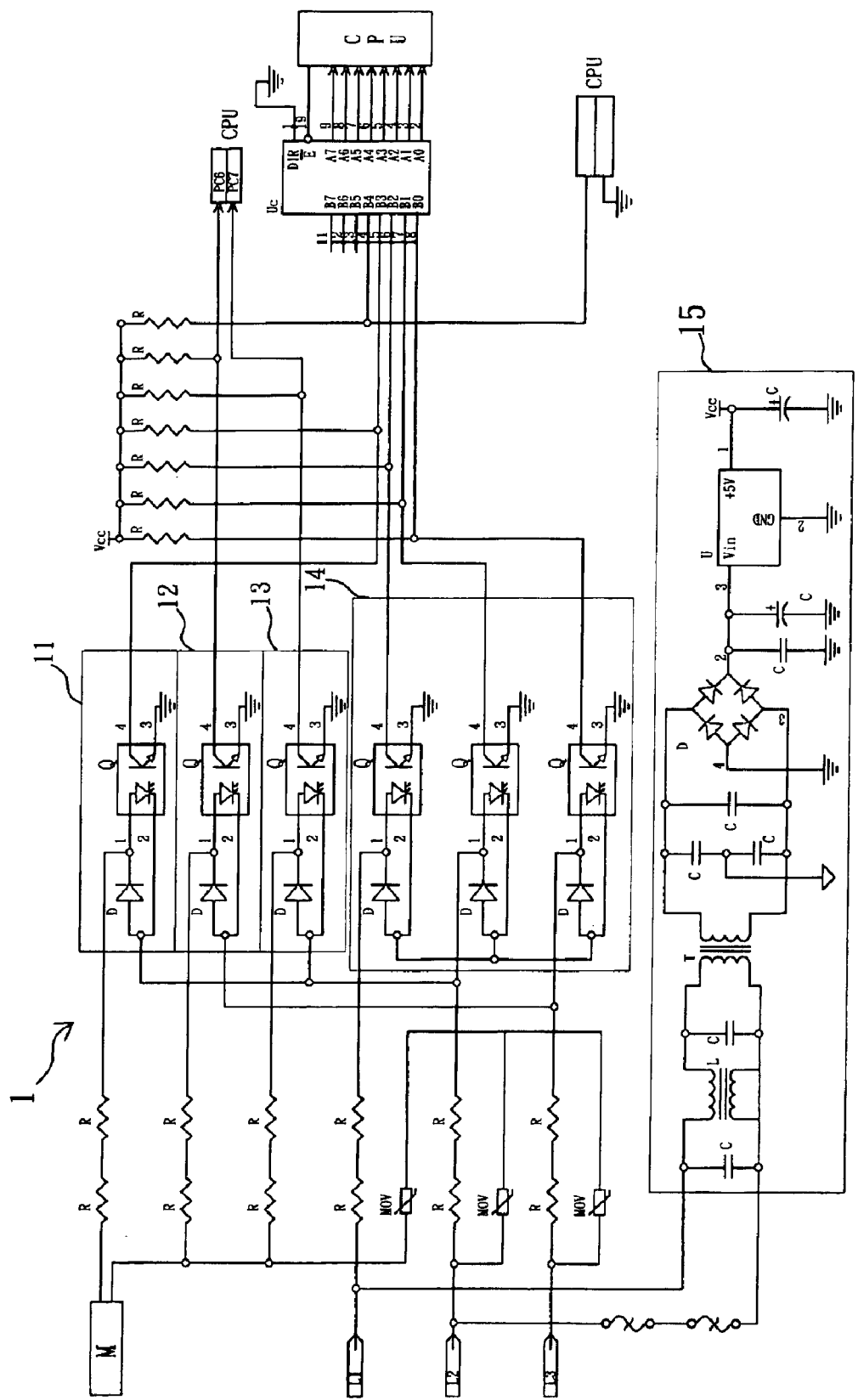
FIG. 1 shows circuit structure of the main control circuit of the present invention.
Figure 2:
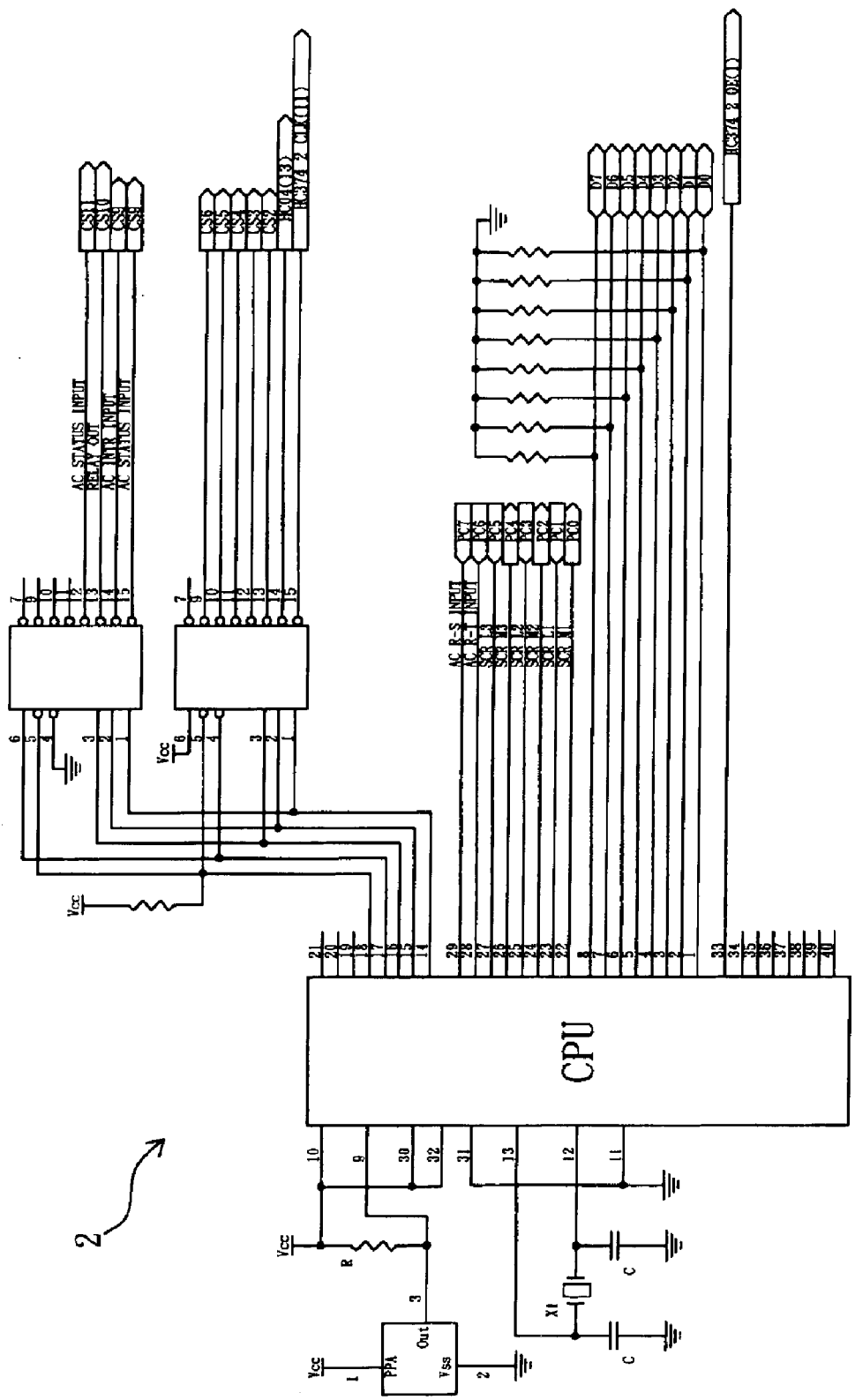
FIG. 2 shows the circuit structure of the CPU control circuit of the present invention.
Figure 3:
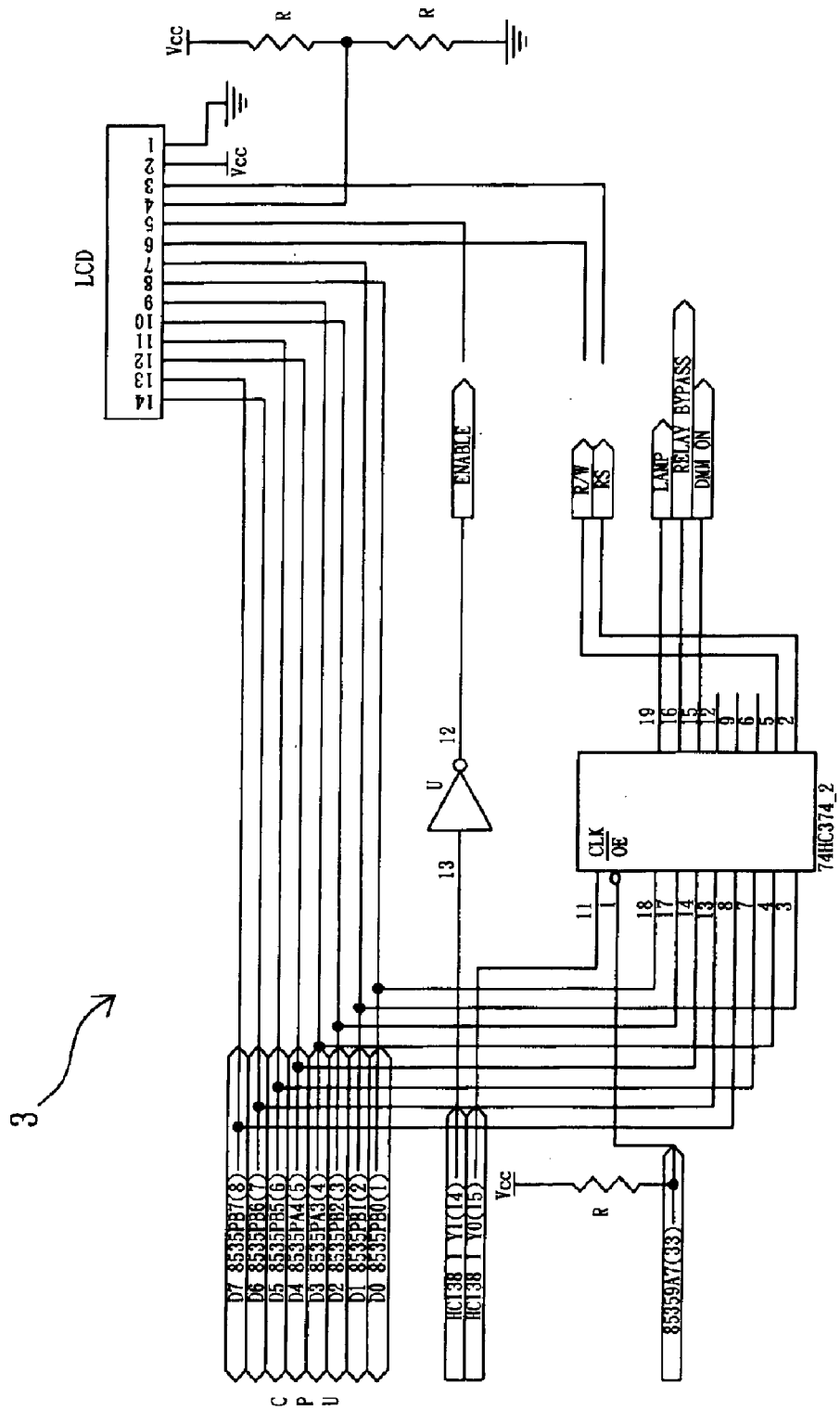
FIG. 3 shows the circuit structure of the display control circuit of the present invention.
Figure 4:
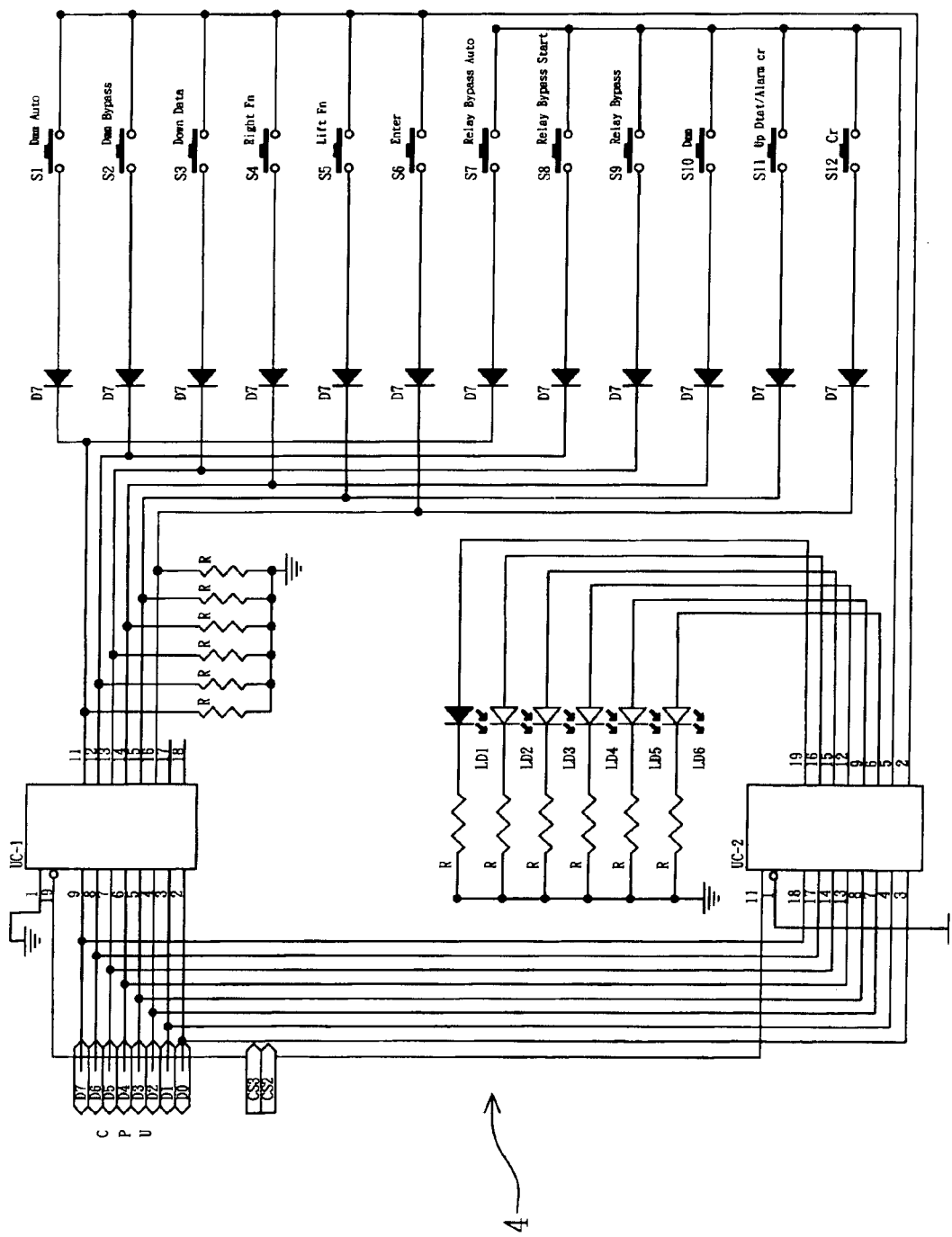
FIG. 4 shows the circuit structure of the function key control circuit of the present invention.
Figure 5:
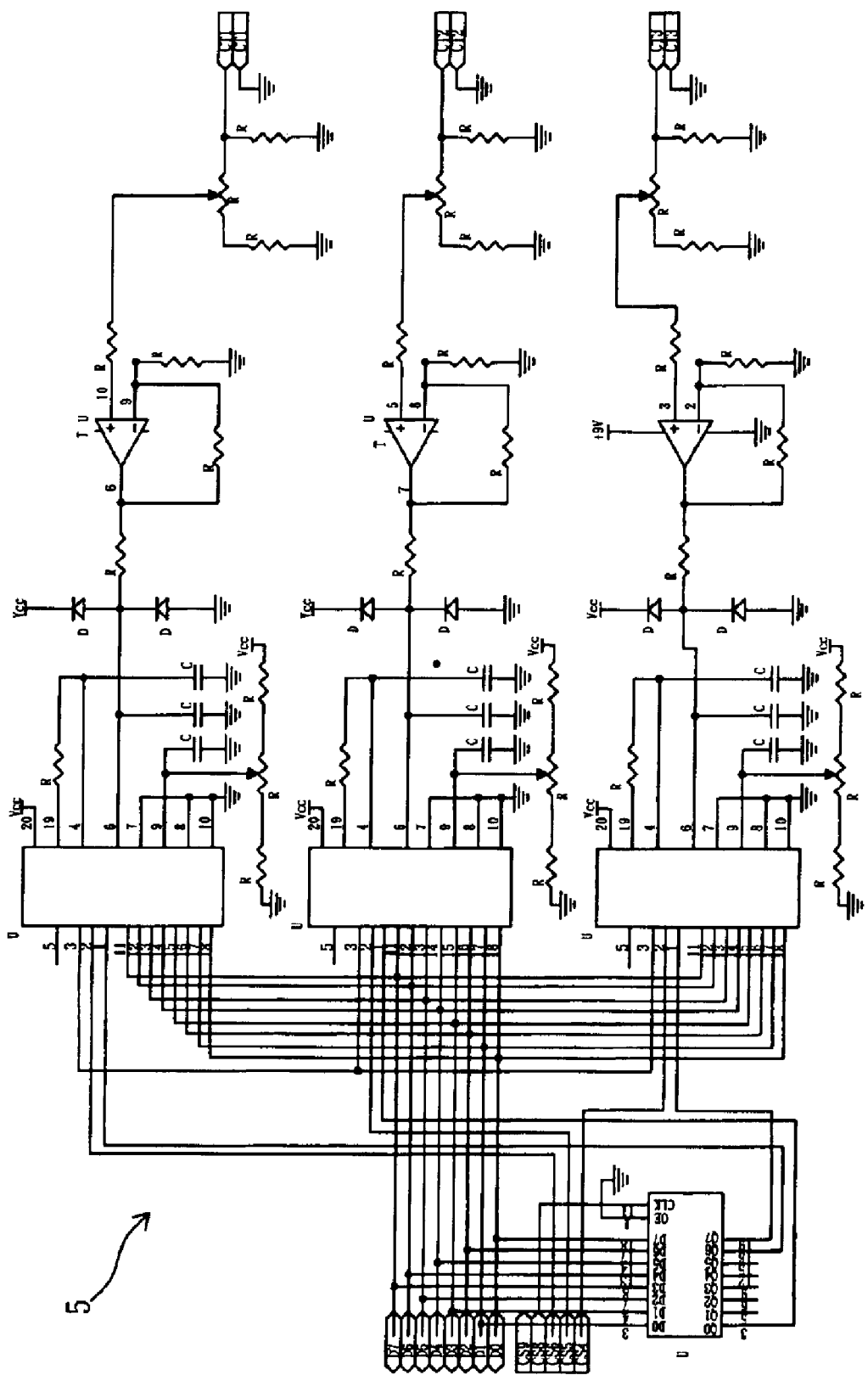
FIG. 5 shows the circuit structure of the current detection circuit of the present invention.
Figure 6:
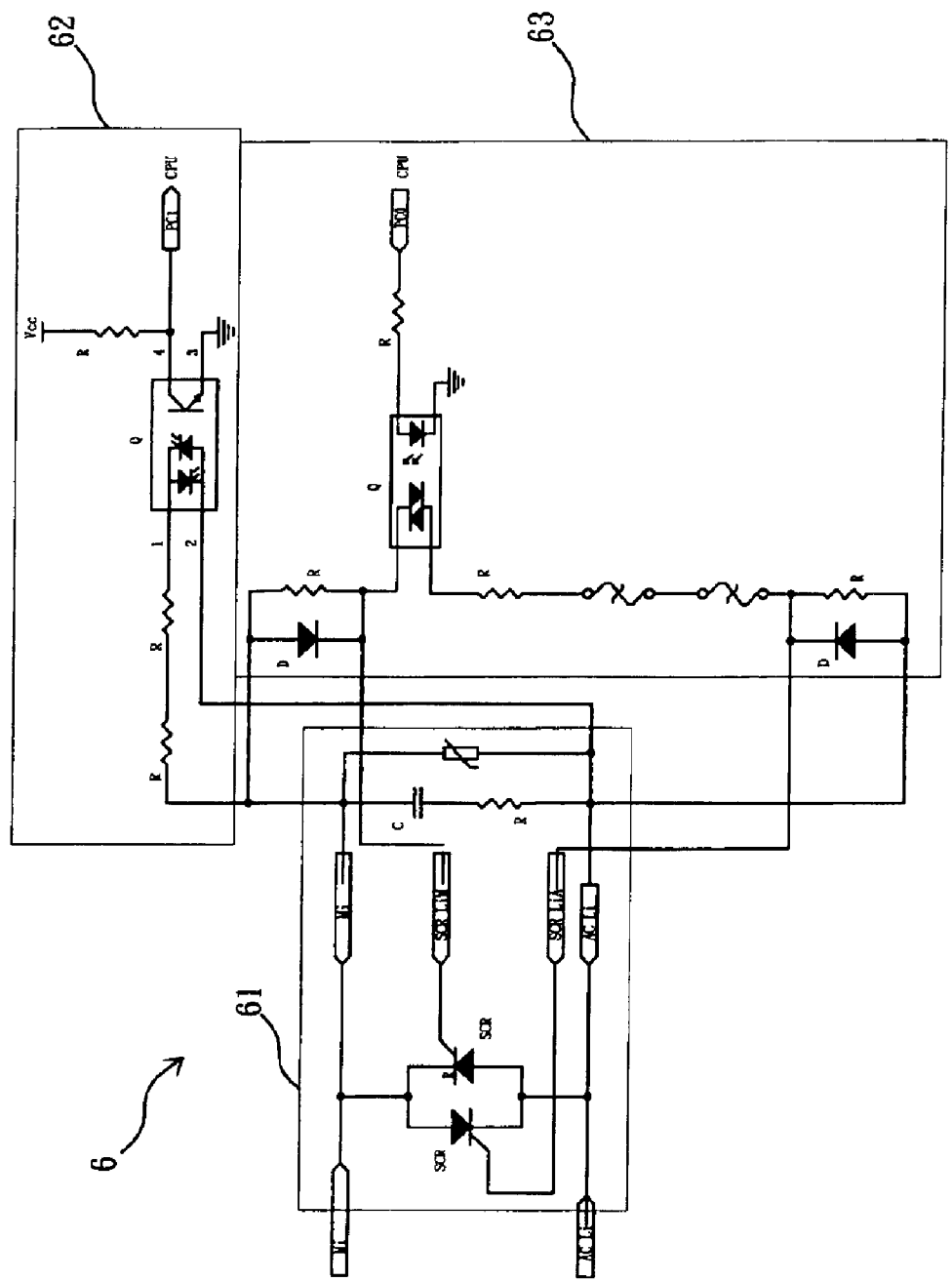
FIG. 6 shows the silicon control trigger circuit of the present invention.
Figure 7:
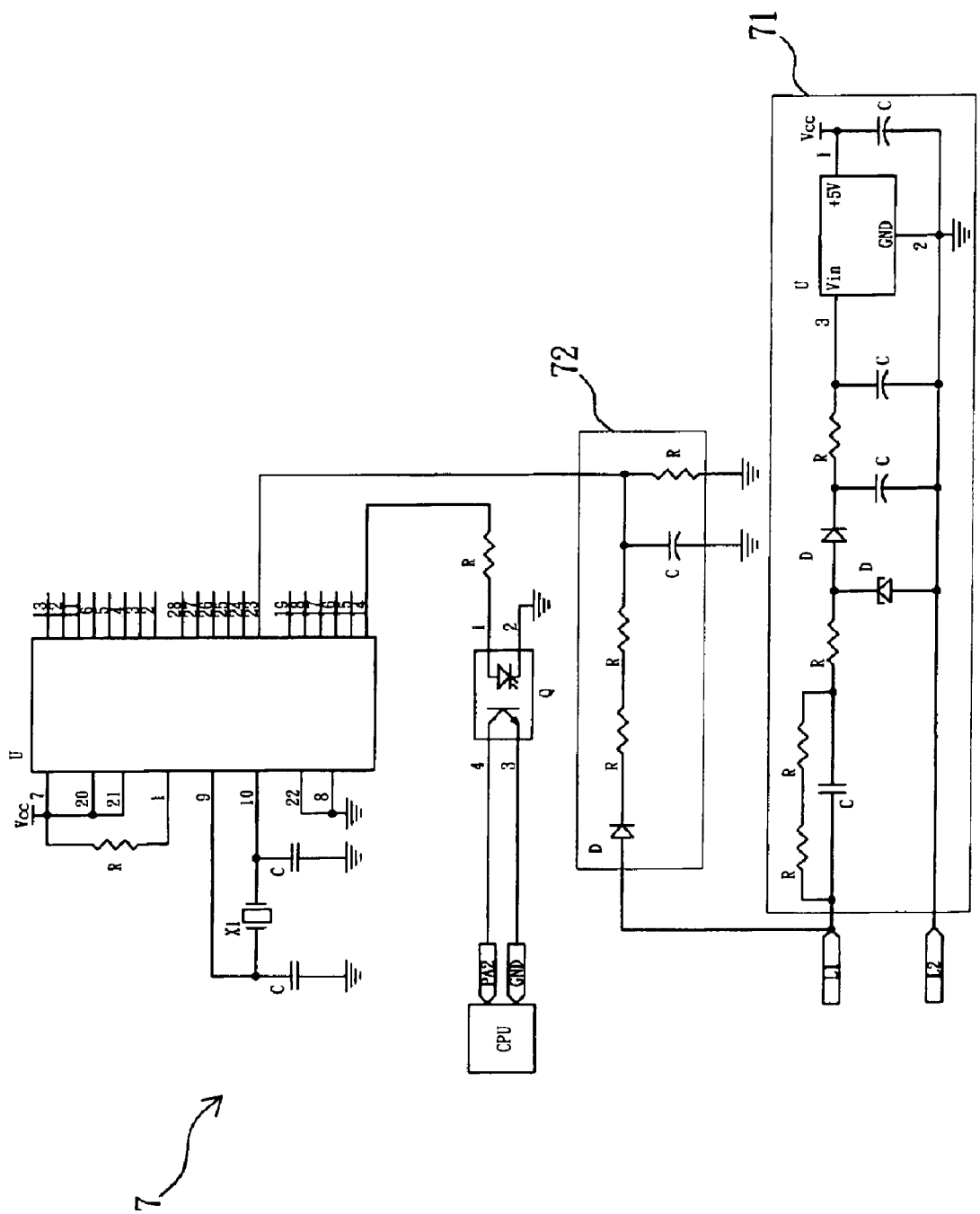
FIG. 7 shows the input voltage detection circuit of the present invention.
Figure 8:
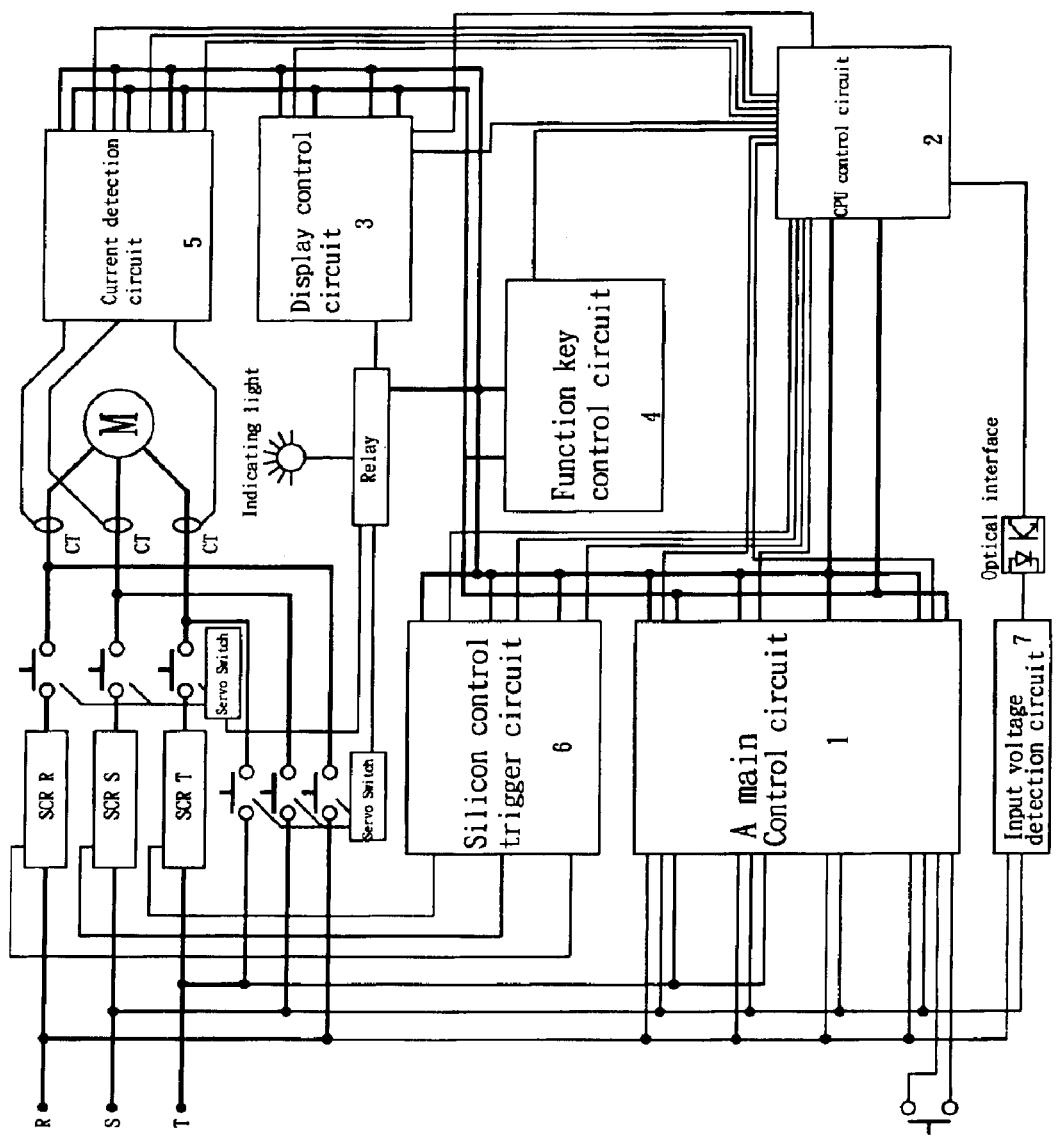
FIG. 8 shows the circuit of the components of the present invention.

With reference to FIGS. 1, 2, 3, 4, 5, 6, 7 and 8, it is illustrated that one control circuit set are connected between three inputs L1, L2 and L3 of different phases and a motor M. The control circuit set includes a main control circuit 1 for controlling phase sequences, a control CUP control circuit 2, a display control circuit 3, a function key control circuit 4, a current detection circuit 5, a silicon control trigger circuit 6, an input voltage detection circuit 7.

The main control circuit 1 is connected to there inputs L1, L2 and L2, and includes a far end motor actuating control circuit 11 for actuating a motor, an L1–L2 phase detection circuit 12 for detecting the phase of the inputs L1 and L2, an L1–L3 phase detection circuit 13 for detecting the phase of the inputs L1 and L3, an actuation phase sequence and phase lose detection circuit 14; and a D. C. power supply circuit 15 for supplying DC power to the main control circuit 1.

When power is actuated, the actuation phase sequence and phase lose detection circuit 14 will determine whether any phase is lost and the result is inputted to the CPU control circuit 2. If any phase is lost, the CPU control circuit 2 will stop the succeeding operation. At the same time, the phase sequences of the input phases L1, L2 and L3 are detected for determining the phases of L1–L2 by using the L1–L2 phase detection circuit 12 and determining the phases of L1–L3 by using the L1–L3 phase detection circuit 13.

The CPU control circuit 2 is connected with the main control circuit 1 and has a CPU (central processing unit) which is connected to the function key control circuit 4. The required control values and control functions are set in the CPU control circuit 2. The CPU control circuit 2 has functions of memory, operation, comparisons, receiving input data, output controlling data, etc.

The display control circuit 3 is connected to the CPU control circuit 2 and has a microprocessor (CPU2) and connected to an LCD display for displaying the control function and state of the wires.

The function key control circuit 4 is connected to the CPU control circuit 2. The function key control circuit 4 includes LED display and includes keys S1 to S12 for power saving in auto or semi-auto modes; full voltage output; data setting; function setting; auto-start, restart or manual start; fault by-pass; changing display state, etc. so as to set required control functions.

The current detection circuit 5 is connected to the CPU control circuit 2 and current comparators CT1, CT2 and CT3 through operation amplifiers T, respectively. The current comparators are connected to the currents of a motor M of different phases for detecting the currents of the motor M to be provided to the CPU control circuit 2 so as to get the values of current variations, phase information of power, controller and motor to know whether any phase is lost, and whether the current is balanced and whether the current is over-loaded. If these conditions exist, then the CPU control circuit 2 will trigger the silicon control trigger circuit 6 to stop the motor M according to the preset stop conditions so as to avoid the abnormal operation of the motor.

The silicon control trigger circuit 6 includes a silicon controlled SCR circuit 61, a feedback current phase detection circuit 62, and a trigger circuit 63. The silicon controlled SCR circuit 61 is serially connected between the power source and the motor M. The feedback current phase detection circuit 62 serves to detect the phase of feedback current and then the detection result is transferred to the CPU control circuit 2. The phase of the feedback current phase is compared with the phase of the voltage of power source for determining the load and for determining the trigger angle of the silicon controlled SCR circuit according to the predetermined conditions so as to trigger and conduct the silicon controlled SCR circuit by the trigger circuit to supply power to the motor M.

The input voltage detection circuit 7 has an independent power supply circuit 71, a voltage reduction circuit 72, a microprocessor U, and a photo coupler transistor Q. The input voltage detection circuit 7 is connected between the L1, L2 and CPU control circuit 2. When the CPU control circuit 2 gets the voltage of input power and the voltage is too high, the silicon controlled SCR circuit will not be triggered and stops the motor so as to protect the motor. When the voltage is too low, the silicon controlled SCR circuit output with a full voltage so as to retain the operation of the motor.

Operation of the present invention will be described here.

When the power is started, the main control circuit 1 detects whether any phase of the power supply is lost and the information is inputted to the CPU control circuit 2. If yes, the CPU control circuit 2 stops the succeeding operation. At the same time, the phase sequence of the inputs L1, L2 and L3 is also detected. According to the phase sequence, the phase of the voltage of the inputs L1–L2 and the phase of the voltage of inputs L1–L3 are determined as the base of load detection. Then the process enters into the stage of motor start.

The user of a motor must be through the stages of start, constant speed operation and stop. The advantages of the present invention include full voltage or smooth start, power saving constant speed operation and full voltage or smooth stop.

In the initial start stage, the full voltage or smooth start is performed. The motor is started by full voltage or through a Y-Δ voltage reduction start device. In smooth start, the start current can be set to be in constant current. If necessary, a surge start can be performed and then a smooth start is used so as to avoid an over large start torque. The smooth start can avoid the problem of over-large current.

After start, the motor M enters into a constant current operation. Firstly, a full voltage operation is performed. Then a power saving control state is performed. At this stage, the CPU control circuit 2 determines the load current according to the input power phase and feedback current phase from the main control circuit 1 and the feedback current phase detection and silicon control semiconductor SCR trigger circuit 6 and triggers the silicon controlled SCR according to a predetermined programs and output power to the motor. The smaller the load, the large the power saving. On the contrary, the larger the load, the smaller the power saving.

Besides, the present invention has other functions, such as full voltage output in non-power saving mode, restart after power interruption automatically or manually, directly connecting the motor to the power supply by a bypass function. This can be achieved by the function keys S1 to S12 in the function key control circuit 4 to input functions to the CPU control circuit 2. The CPU control circuit 2 has functions of stopping operation in over current or over voltage, full voltage output in low voltage under in non-power saving mode; stopping operation of the motor under the state of losing phase in power or motor as the motor is in operation.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multi-functional motor control device having connected between three input currents of different phases and a motor; comprising:

a main control circuit connected to the there input currents, and including a far end motor actuating control circuit for actuating a motor, a first phase detection circuit for detecting the phase of a pair input of currents selected from the three input currents, a second phase detection circuit for detecting the phase of another pair of input currents, an actuation phase sequence and phase lose detection circuit; and a DC power supply circuit for supplying DC power to the main control circuit;

a CPU control circuit connected with the main control circuit and having a CPU; required control values and control functions being set in the CPU control circuit; the CPU control circuit having functions of recording, operation, comparison, receiving input data, output controlling data;

a display control circuit being connected to the CPU control circuit and having a microprocessor and connected to an LCD display for displaying control functions and states of the inputs;

a function key control circuit connected to the CPU control circuit; the function key control circuit including LED display and including keys for power saving in auto or semi-auto modes; full voltage output; data setting; function setting; auto-start, restart or manual start; fault by-pass; changing display state, etc. so as to set required control functions;

a current detection circuit being connected to the CPU control circuit and three current comparators through operation amplifiers, respectively; the current comparators being connected to the currents of a motor of different phases for detecting the currents of the motor to be provided to the CPU control circuit so as to get the values of current variations, phase information of power, controller and motor to know whether any phase is lost, and whether the current is balanced and whether the current is over-loaded; if these conditions exist, then the CPU control circuit will trigger the silicon control trigger circuit to stop the motor according to preset stop conditions so as to avoid the abnormal operation of the motor;

a silicon control trigger circuit including a silicon controlled SCR circuit, a feedback current phase detection circuit, and a trigger circuit; the silicon controlled SCR circuit being serially connected between the power source and the motor; the feedback current phase detection circuit serving to detect the phase of feedback current and then transfer detection results to the CPU control circuit; a phase of the feedback current phase being compared with a phase of the voltage of power source for determining the load and for determining the trigger angle of the silicon controlled SCR circuit according to the predetermined conditions so as to trigger and conduct the silicon controlled SCR circuit by the trigger circuit to supply power to the motor;

an input voltage detection circuit having an independent power supply circuit, a voltage reduction circuit, a microprocessor, and a photo coupler transistor; the input voltage detection circuit being connected between the L1, L2 and CPU control circuit;

when the CPU control circuit gets the voltage of input currents and the voltage is too high, the silicon controlled SCR circuit will not be triggered and stops the motor so as to protect the motor; when the voltage is too low, the silicon controlled SCR circuit output with a full voltage so as to retain the operation of the motor;

when power is actuated, the actuation phase sequence and phase lose detection circuit will determine whether any phase is lost and the result is inputted to the CPU control circuit; if any phase is lost, the CPU control circuit will stop the succeeding operation; at the same time, the phase sequences of the input currents are detected for determining the phases of the three input currents by using the first and second phase detection circuit.

* * * * *